United States Patent [19]

Kondo

[11] Patent Number: 5,196,931
[45] Date of Patent: Mar. 23, 1993

[54] HIGHLY EFFICIENT CODING APPARATUS PRODUCING ENCODED HIGH RESOLUTION SIGNALS REPRODUCIBLE BY A VTR INTENDED FOR USE WITH STANDARD RESOLUTION SIGNALS

[75] Inventor: Tetsujiro Kondo, Tokyo, Japan

[73] Assignee: Sony Corporation, Tokyo, Japan

[21] Appl. No.: 811,973

[22] Filed: Dec. 23, 1991

[30] Foreign Application Priority Data

Dec. 28, 1990 [JP] Japan .................................. 2-417504

[51] Int. Cl.⁵ .......................... H04N 7/12; H04N 7/13
[52] U.S. Cl. ..................................... 358/133; 358/135
[58] Field of Search ................ 358/133, 135, 140, 137

[56] References Cited

U.S. PATENT DOCUMENTS

| | | | |
|---|---|---|---|
| 4,722,003 | 1/1988 | Kondo ................... | 358/135 |
| 4,845,560 | 7/1989 | Kondo et al. .......... | 358/133 |
| 5,049,990 | 9/1991 | Kondo et al. .......... | 358/133 |
| 5,068,726 | 11/1991 | Kondo et al. .......... | 358/135 |

*Primary Examiner*—Tommy P. Chin
*Attorney, Agent, or Firm*—Alvin Sinderbrand; William S. Frommer

[57] ABSTRACT

A highly efficient coding apparatus encodes high resolution digital video data so it can be decoded as either high resolution format or standard resolution format video data. The high resolution video data is divided into blocks, and then into sub-blocks of N picture elements, where N is the ratio of the resolution of the high resolution format to that of the standard resolution format. Each sub-block of N picture elements is averaged, and the averaged data is encoded via adaptive dynamic range coding (ADRC). The encoded averaged data can be decoded as standard resolution video data. The difference between each of the N picture elements and its corresponding average value is separately encoded as additional data. The combined encoded averaged data and additional data can be decoded as high resolution video data. Also, ADRC encoded data recorded by a standard resolution VTR can be reproduced by a high resolution VTR to provide a signal having a high resolution number of picture elements although only a standard resolution image.

9 Claims, 7 Drawing Sheets

Fig. 2

| X11 X12 | X13 X14 | X15 X16 | X17 X18 |
|---------|---------|---------|---------|
| X21 X22 | X23 X24 | X25 X26 | X27 X28 |
| X31 X32 | — — —   | — — —   | — — —   |
| X41 X42 | — — —   | — — —   | — — —   |
| X51 —   | — — —   | — — —   | — — —   |
| X61 —   | — — —   | — — —   | — — —   |
| X71 —   | — — —   | — — —   | X77 X78 |
| X81 —   | — — —   | — — —   | X87 X88 |

Fig. 3

| y11 | y12 | y13 | y14 |
|-----|-----|-----|-----|
| y21 | y22 | y23 | y24 |
| y31 | y32 | y33 | y34 |
| y41 | y42 | y43 | y44 |

| ADDITIONAL CODE | | VALUE | DECODED VALUE |
|---|---|---|---|
| 0 | 1 | 1 | y + Δ |
| 0 | 0 | 0 | y |
| 1 | 0 | −1 | y − Δ |
| 1 | 1 | −2 | OTHERS |

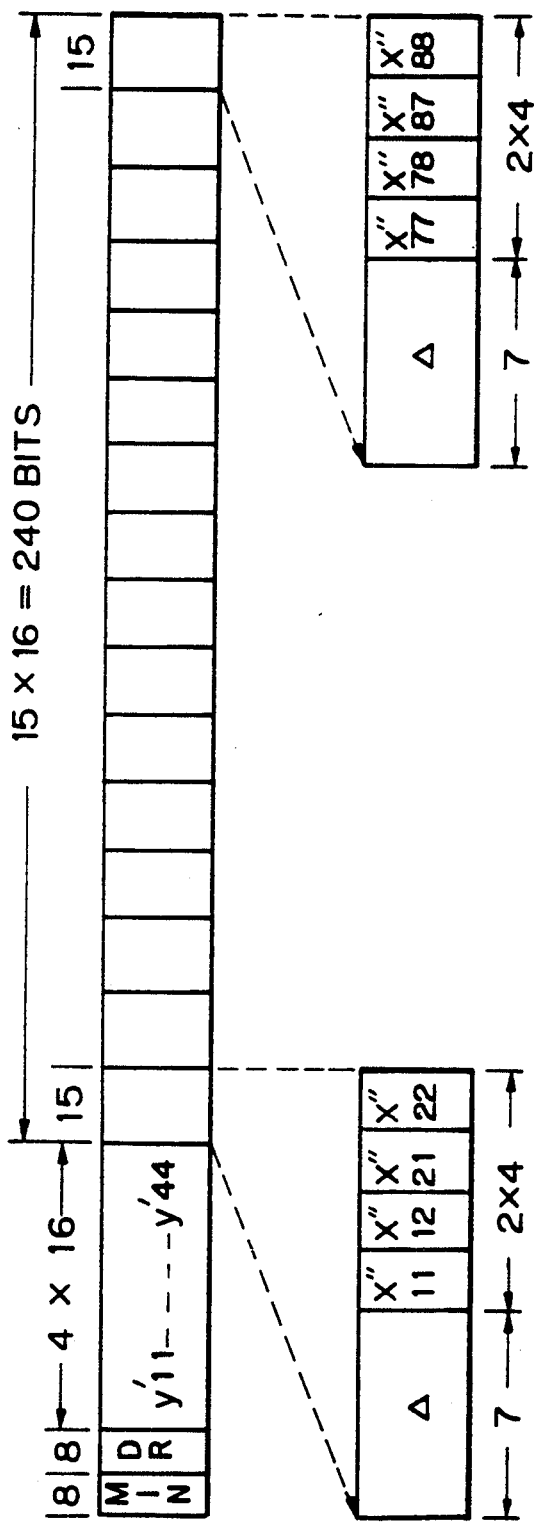
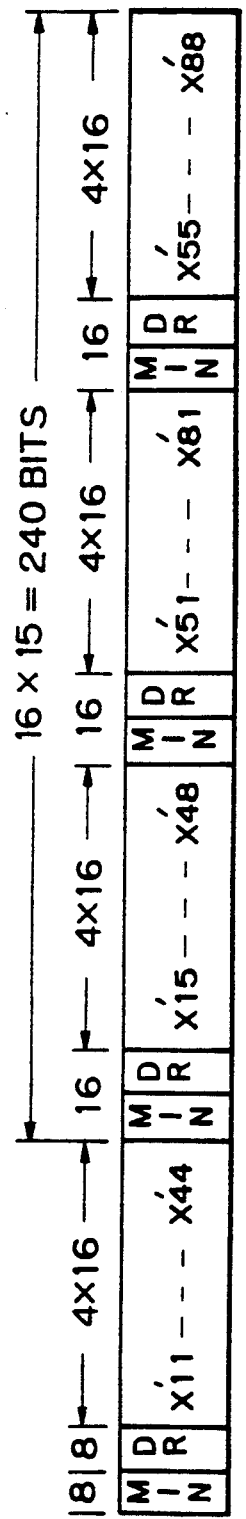
Fig. 10A
Fig. 10B

HIGHLY EFFICIENT CODING APPARATUS PRODUCING ENCODED HIGH RESOLUTION SIGNALS REPRODUCIBLE BY A VTR INTENDED FOR USE WITH STANDARD RESOLUTION SIGNALS

BACKGROUND OF THE INVENTION

1. Field of the Invention

This invention relates to a highly efficient coding apparatus for encoding a digital video signal into a format which can be decoded into a video signal compatible with either of two video signal standards having different resolutions.

2. Description of the Prior Art

It has been proposed to provide a television system with a higher resolution than the NTSC system now in practical use. Also, research and development of peripheral equipment such as video tape recorders (VTRs) and video cameras have been done with respect to the proposed higher resolution system. For example, the recording of a high resolution video signal in the form of digital data, for example, has also been proposed. In even the existing standard resolution system, the information amount of a digital video signal is large, and there is a need to record/reproduce a much greater amount of information in the case of a digital video signal. For this purpose, it is common to adopt highly efficient coding for compression of the amount of data to be recorded at the time of recording a high resolution digital video signal.

Conventionally, highly efficient coding methods applicable to a digital video signal with high resolution and those applicable to digital video signal with standard resolution are independent of each other and have no compatibility with each other. However, assuming the case of a digital VTR in a period when plural systems are in use, it is desirable that a tape recorded by a digital VTR having high resolution (called HD VTR) be capable of being reproduced by a digital VTR having standard resolution (called SD VTR). Also, conversely, it is desirable that a tape recorded by the SD VTR be capable of being reproduced by the HD VTR. For not only a VTR but also for transmission and reception of a digital video signal, the above mentioned bidirectional compatibility is effective to make coding and decoding equipment common so as to reduce the hardware size and improve its marketability.

OBJECTS AND SUMMARY OF THE INVENTION

An object of the invention is therefore to provide a highly efficient coding apparatus with bidirectional compatibility between a high resolution digital video signal and a standard resolution digital video signal.

Another object of the invention is to provide a highly efficient coding apparatus which is capable of increasing the efficiency of digital video signal encoding.

According to an aspect of the invention, there is provided a highly efficient coding apparatus for encoding a digital video signal comprised of digital video data representing picture elements according to a first standard having a picture element resolution substantially N times higher than that of a second standard, comprising: averaging means for averaging digital video data of the digital video signal representing N picture elements to generate averaged data, block encoding means for encoding the averaged data in a block format allowing data compression to generate encoded data, subtracting means for generating the subtracted data representing a difference between each of the digital video data representing the N picture elements and the averaged data, additional encoding means for encoding the subtracted data to generate additional data, and combining means for combining the encoded data and the additional data in a predetermined order to generate combined encoded data compatible with the first standard and the second standard.

The above, and other, objects, features and advantages of the present invention will become readily apparent from the following detailed description thereof which is to be read in connection with the accompanying drawings.

BRIEF DESCRIPTION OF THE DRAWINGS

FIG. 2 is a schematic diagram showing picture elements of a digital video signal;

FIG. 3 is a schematic diagram showing average value of the picture elements of FIG. 2;

FIGS. 10A and 10B are schematic diagrams each showing a format for of recording data;

DETAILED DESCRIPTION OF THE PREFERRED EMBODIMENT

Hereafter, one embodiment of this invention will be described with reference to the drawings. This embodiment is for a digital video signal recording apparatus where a video signal with high resolution, for example, a high vision or definition signal, is recorded onto a magnetic tape by a rotary head.

Figure 1:
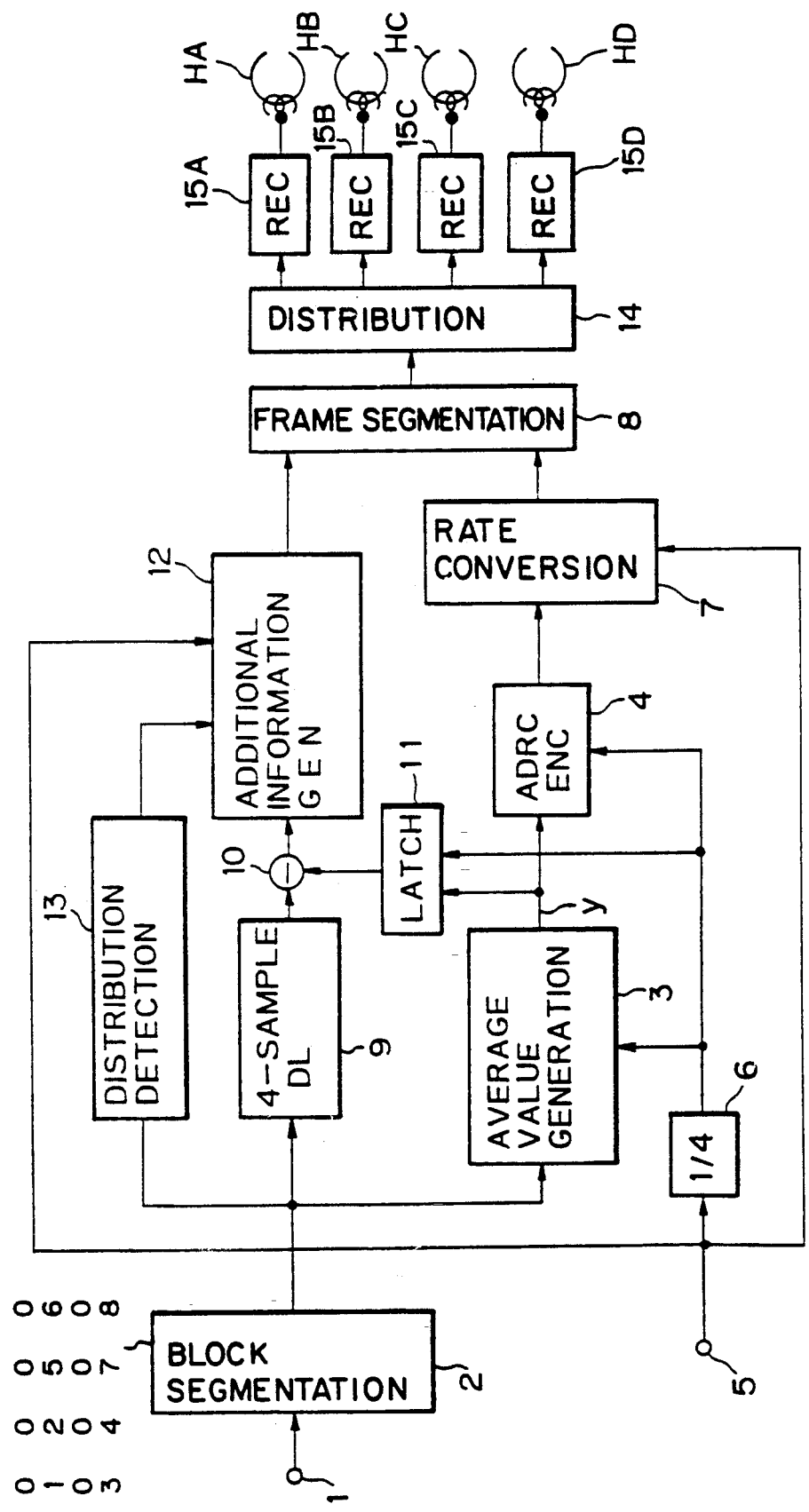
FIG. 1 is a block diagram of an embodiment of the present invention.

In FIG. 1, an input terminal 1 receives a high resolution digital video signal to be recorded, and each picture element of the video signal has been digitized into eight bits. A block segmentation circuit 2 converts picture element data in the sequence of raster scanning into data having a subblock structure of (2 picture elements $\times$ 2 lines). As shown in FIG. 2, in the case where the subblock of (2 picture elements $\times$ 2 lines) is composed of picture element data x11, x21, x12 and x22, the picture element data is output in the order of x11, x12, x21 and x22 from the block segmentation circuit 2. The size of the subblock corresponds to the ration N of the resolution of a high resolution digital video signal to that of a standard digital video signal or the ration N of their data amounts. A high vision signal has picture elements in the horizontal direction and lines in the vertical direction which are almost twice those in the existing NTSC system and the resolution of the high vision signal is nearly four times that in the latter system. Therefore, the subblock is composed of four picture elements.

The output of the block segmentation circuit 2 is supplied to each of an average value generating circuit 3, a 4-sample delay circuit 9 and a distribution detection circuit 13. In the average value generating circuit 3, the average value y of each subblock of picture elements is developed. As shown in FIG. 3, for example, an average value $y11=(=x11+x12+x21+x22)/4$ corresponding to the picture element data x11, x12, x21 and x22 is developed. For other subblocks, average values y12, y13, . . . , y44 are developed similarly. As a result, $(4\times4=16)$ average values of FIG. 3 are formed from the area of (8 picture element $\times$ 8 lines) picture element data. The average value data is given to an ADRC encoder 4 and a latch 11.

A clock signal with a sampling frequency synchronized with the frequency of the input digital video signal is supplied to an input terminal 5. The clock signal is supplied to a frequency divider 6 to form a clock signal with one-fourth of the frequency of the input clock. The clock signal from the frequency divider 6 is supplied to each of the average value generating circuit 3, the latch 11 and the ADRC encoder 4. These circuits operate in synchronism with the frequency divided clock signal. Average values of each subblock are received by the latch 11.

Adaptive dynamic range coding (ADRC) has been proposed by the present applicant and is coding adaptive to a dynamic range DR which is the difference between a maximum value MAX and a minimum value MIN of picture element data within an ADRC block. In this example, the average value data of $(4\times4)$ of FIG. 3 is taken as the ADRC block. At the ADRC encoder 4, the maximum value MAX and a minimum value MIN in the average values y11 to y44 are detected, the dynamic range DR is calculated, and each average value is quantized into a code signal of 4-bit length adapted to the dynamic range DR. The quantization is the processing where the average data is divided by a quantized step obtained by $(DR/2^4)$ and from its quotient an integer is developed. The number of bits the encoded signal developed at the ADRC encoder is not limited to four bits and the encoded signal may alternatively have a variable length number of bits.

The encoded average value from the ADRC encoder 4 is supplied to a rate converting circuit 7. A clock signal from the input terminal 5 is supplied to the rate converting circuit 7 so that the data rate of the encoded average value data is converted into the original rate, i.e., the sampling rate of a high resolution digital video signal. An output signal of the rate converting circuit 7 is supplied to a frame segmentation circuit 8.

The 4-sample delay circuit 9 delays the digital video data of the input video signal representing (N=4) picture elements until an average value y is developed. The output of this delay circuit 9 is supplied to a subtracter 10. Average value data from the latch 11 is supplied to the subtracter 10. As a result, a difference between each of the picture element data and average value data is detected with respect to each subblock at the subtracter 10. To an additional information generating circuit 12, this difference data is given. A detection signal from a distribution detecting circuit 13 and the clock signal from the input terminal 5 are supplied to the additional information generating circuit 12. The distribution detecting circuit 13 generates a detection signal corresponding to the distribution of levels of the digital video data of each subblock. Additional information is developed from the detection signal, the output signal of the subtracter 10 and allowance information when necessary. The additional information includes a difference signal $\Delta$ and a 2-bit signal corresponding to each of the picture element data.

Figures 4, 6:
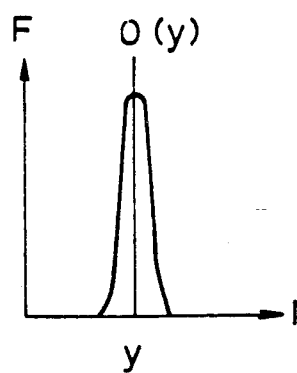
FIG. 4 is a diagram describing the additional information and a decoded value.
FIG. 6 is a schematic diagram showing a first example of frequency distribution.

FIG. 4 shows the development of the additional information. Picture element data of each of the subblocks is encoded as a 2-bit additional code. When the additional code is (2 bits of 01 : value of 1), $y+\Delta$ is decoded, which is equal to the sum of the average value y of the sub-block and a difference data $\Delta$; when the additional code is (2 bits of 00 : value of 0), average value y of the block is decoded; when the additional code is (2 bits of value of 10 : value $-1$), $y-\Delta$ is decoded, which is the result of subtracting the difference data $\Delta$ from the average value y of the sub-block; and when the additional code is (2 bits of 11 : value of $-2$), a freely selected value, discussed below, is decoded.

Figure 5:
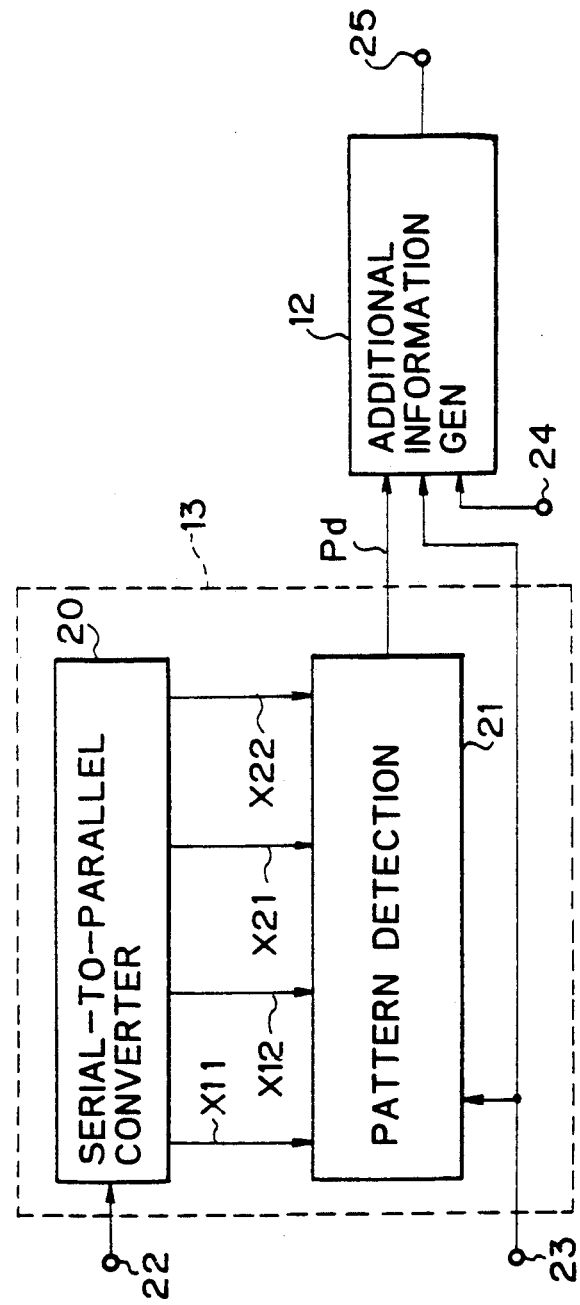
FIG. 5 is a block diagram showing a specific structure of a distribution detecting circuit.

The distribution detection circuit 13 is constructed as a serial-to-parallel converter 20 and a pattern detector 21 as indicated within a broken line in FIG. 5. The output signal of the block segmentation circuit 2 is supplied to the serial-to-parallel converter 20 through an input terminal 22. The serial-to-parallel converter 20 supplies picture element data of a subblock, for example, x11, x12, x21, and x22 to the pattern detector 21 in a parallel fashion. The pattern detector 21 detects a pattern of distribution of the four picture element data to generate a detection signal Pd. The detection signal Pd is given to the additional information generating circuit 12. Allowance information is fed to the pattern detector 21 and the additional information generating circuit 12 from an input terminal 23 to set a range for allowance. The additional information generating circuit 12 forms additional data for every subblock using a difference signal supplied from an input terminal 24, the detection signal Pd and the allowance information from the input terminal 23. This additional data is output at an output terminal 25.

A pattern detection made by the pattern detector 21 will be explained with reference to FIGS. 6, 7A-7C, 8A, 8B and 9. In these drawings, the abscissa indicates a level I of picture element data within a subblock, while the ordinate indicates a generation frequency F. Distribution of frequencies expressed by this graph is classified into m (m$\leq$4) representative levels. FIG. 6 shows (m=1), i.e., the case where one representative level expresses the distribution pattern of levels of the digital video data representing 4 picture elements. For each of the four picture element data in this case, the value of 0, i.e., 2 bits of (00), is allotted. A decoded value x" (0) of this code signal (00) is the average value y.

Figure 7A:
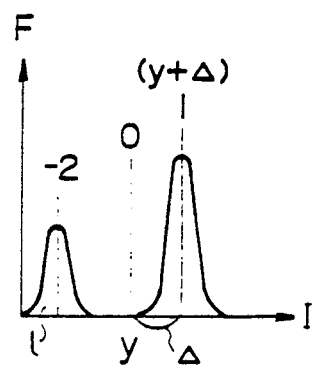
FIGS. 7A-7C are schematic diagrams showing a second example of frequency distribution.
Figure 7B:
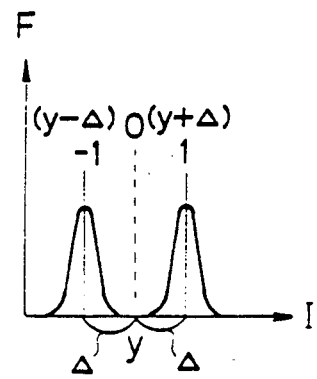
Figure 7C:
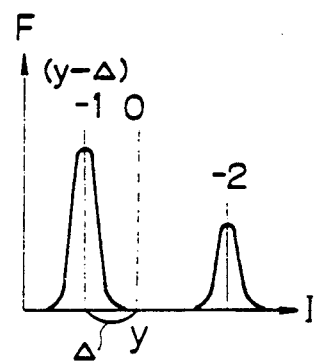

FIGS. 7A-7C show the case of (m=2), that is, three distribution patterns where two levels are needed to represent the levels of the digital video representing 4 picture elements. In this case, additional data is formed using two of the values $+1$, $-1$ $-2$. The distribution pattern of FIG. 7 indicates that the frequency of the level, or value of $y+\Delta$ is larger than the frequency 2 of the other level. In this case, for picture element data of levels, that is, values, with larger frequencies, the value of 1, i.e., 2 bits of (01) are allotted, while the value of −2, i.e., 2 bits of (11) are allotted for other levels. A decoded value x" (1) of (01) is y+Δ, and a decoded value x" (−2) of (11) is represented by the following equation:

$$(4y - (4 - l)(x''(1)))/l = y + ((4 - l)/l)\Delta$$

In the distribution expressed by FIG. 7B, there exist two equal distribution frequencies of the levels of y+Δ and the level of y−Δ. In this case, for picture element data of the level of one frequency, the value of 1, i.e., 2 bits of (01) are allotted, while for other frequency, the value of −1, i.e., 2 bits of (10) are allotted. The decoded value x" (1) of (01) is y+Δ and the decoded value x" (−1) of (10) is y−Δ.

The distribution pattern shown in FIG. 7C indicates that the frequency of the level of y−Δ is larger than that of the levels. In this case, for picture element data of levels with larger frequencies, the value of −1, i.e., 2 bits of (10) are allotted, while for others, the value of −2, i.e., 2 bits of (11) are assigned. The decoded value x" (−1) of (01) is y−Δ, and the decoded value x" (−2) is calculated in a manner similar to that mentioned above.

Figure 8A:
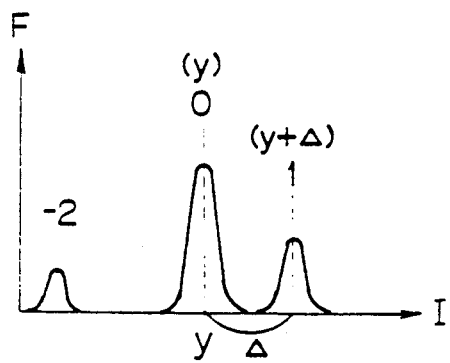
FIGS. 8A and 8B are schematic diagrams showing a third example of frequency distribution.
Figure 8B:
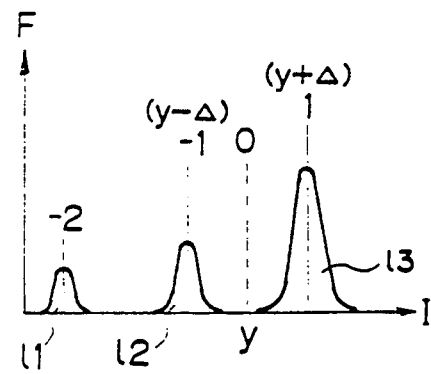

FIGS. 8A and 8B show the case of (m=3). The distribution pattern of FIG. 8A indicates that the frequency of the average value y is the largest, that the frequency of level of Y+Δ, which is the difference from the average value y is the second largest and that the frequencies of levels other than these levels are the smallest. In this case, 2 bits of (00) are allotted to picture element data of the average value y, 2 bits of (01) are allotted to picture element data of y+Δ, and 2 bits of (11) are allotted to picture element data of other levels. In place of y+Δ, similar treatment is made even when the frequency of level of y−Δ is the second largest. Namely, the first case of (m=3) is the case where the highest of three frequencies can be encoded as (00). The decoded value x" (−2) can be calculated in a manner similar to the manner explained for FIG. 7A.

The distribution pattern of FIG. 8 is the case where two of three levels can be encoded as (1 : 01) and (−1 : 10). In other words, FIG. 8 shows the case in which the frequency of the levels y+Δ or y−Δ is greater than the frequencies of other levels. In this case, 2 bits of (01) are allotted to picture element data of the level of y+Δ, 2 bits of (10) are allotted to picture element data of the level of y−Δ, and 2 bits of (11) are allotted to picture element data of other levels. The decoded value x" (−2) of FIG. 8B is calculated by the following equation when the frequencies are l1, l2 and l3:

$$x''(-2) = (4y - (l2)(x''(-1)) - (l3)(x''(1)))/l1$$

$$x''(-2) = (4y - (l2)(y - \Delta) - (l3)(y + \Delta))/l1$$

$$x''(-2) = y + (l2/l1)\Delta - (l3/l1)\Delta$$

In cases other than the case of (m=3) shown in FIGS. 8A and 8B, quantization is performed by disregarding the actual distribution similarly to the conventional coding so as to develop two bits of (0 : 00), (1 : 01), and (−1 : 0). Here, the code (00) means the central value rather than the average value. In this example in which a subblock consists of four picture elements, the frequency of each level is 1.

Figure 9:
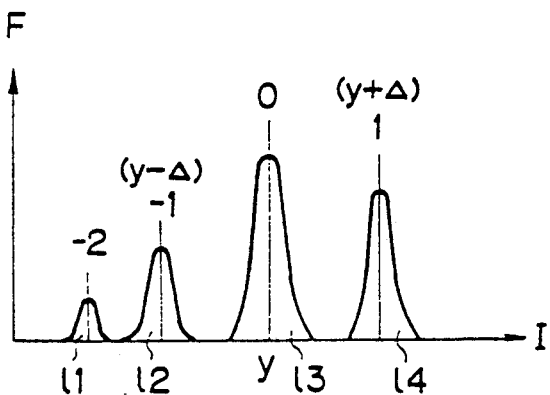
FIG. 9 is a schematic diagram showing a fourth example of frequency distribution.

FIG. 9 shows the case of (m=4). FIG. 9 indicates when three out of four levels can be represented by 0 and ±1. In the distribution pattern shown in the graph of FIG. 9, the frequency of the average value y is highest, the frequency of the level or value, of y+Δ and that of the level of y−Δ are the second highest, and the frequency of other levels are the least. In this case, 2 bits (00) are allotted to picture element data of the average value y, 2 bits (01) are allotted to picture element data of value y+Δ, and 2 bits (11) are allotted to picture element data of other levels. A decoded value x" (−2) of FIG. 9 is calculated by the following equation when the frequencies are l1, l2, l3 and l4:

$$x''(-2) = (4y - (l2)(x''(-1)) - (l3)(x''(0)) - (l4)(x''(1)))/l1$$

$$x''(-2) = (4y - (l2)(y - \Delta) - (l3)(y) - (l4)(y + \Delta))/l1$$

$$x''(-2) = y + (l2/l1)\Delta - (l4/l1)\Delta$$

In cases other than the case (m=4) shown in FIG. 9, quantization is done by disregarding the actual distribution as in the prior art coding, so that 2 bits of (0 , 00), (1 , 01), and (−1 : 10) are developed. It is to be noted that the code of (00) means the center value rather than the average value. In this example in which the subblock is composed of four picture elements, the frequencies of respective levels of FIG. 9 are 1, respectively.

In the case of a small subblock such as (2×2) as in this embodiment, the case almost always corresponds to either (m=1) or (m=2) and rarely corresponds to (m=3) or (m=4). Also, on the reproduction side, a calculation equation for decoding picture element data which are allotted 2 bits of (11) from the other two-bit information within the subblock is decided.

As described before, a detection signal Pd is generated from the distribution detecting circuit 13 to distinguish the case of a pattern of one value (m=1), the case of a pattern of two values (m=2), the case of a pattern of three values (m=3), and the case of a pattern of four values (m=4). By the use of the detection signal Pd and a difference signal from the subtracter 10, the additional information generating circuit 12 generates difference data Δ for each sub-block and 2-bit data corresponding to each picture element. For instance, when the output of the distribution detecting circuit 13 indicates the case of m=2 and the pattern of FIG. 7B), 2 bits of (01) are generated in response to the positive sign of the output Δ of the subtracter 10, and 2-bits of (10) are generated in response to its negative sign. These additional data are supplied to the frame segmentation circuit 8.

The frame segmentation circuit 8 combines the encoded average value data output from the rate converting circuit 7 and the additional data from the additional data generating circuit 12 and further performs the addition of a synchronization signal and an ID signal as well as the processing to generate and append an error correction code, etc. Recording data corresponding to picture element data in FIGS. 2 and 3 is shown in FIG. 10A. An output obtained when average value data is ADRC encoded is arranged at a position in the vicinity of the head of the recording data. Additional data relating to each picture element data of 16 subblocks are then arranged. It is to be noted that since the synchronization signal, a redundancy code of the error correction code, the ID signal, etc., are not essential to the present invention, their illustration is omitted.

When the ADRC block of (4×4) for the average values y11, . . . , y44 is generated, the minimum value MIN (8 bits) and dynamic range DR (8 bits) and code signals (4 bits) y11', ..., y44' corresponding to each average value are arranged in that order. Next, additional data for the subblock consisting of x11, x12, x21, and x22, that is, difference data (7 bits are needed to express the difference between picture element data of 8 bits) and code signals x11'', ..., x22'', each of which has 2 bits, are arranged. As a result, additional data of 15 bits (=7+2×4) in total is generated with respect to each subblock. The additional data for 16 subblocks totals 240 bits. Hereunder, additional data of each subblock is arranged sequentially, and additional data of the subblock of x77, x78, x87, and x88 is last in the sequence.

The above-mentioned output signal of the frame segmentation circuit 8 is supplied to a distributing circuit 14 and divided into recording signals for 4 channels. A first-channel (called channel A) recording signal is supplied to a recording circuit 15A whose output signal is supplied to a rotary head HA. Recording signals of the second, third and fourth channels (channels B, C, and D) are given to rotary heads HB, HC, and HD through recording circuits 15B, 15C, and 15D in a manner similar to the first channel. The recording circuits 15A to 15D are composed of a digital modulator and a recording amplifier. The recording signal of the channel A is consists of only coded signals (MIN and DR and code signals y11', ..., y44') related to average values of recording data of FIG. 10A. The additional data is divided among the channels B, C and D.

Figure 11:
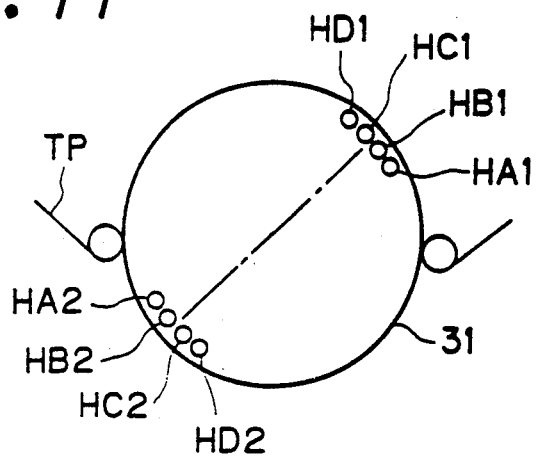
FIG. 11 is a schematic diagram showing an arrangement of rotary heads a VTR for a high resolution video signal.
Figure 12:
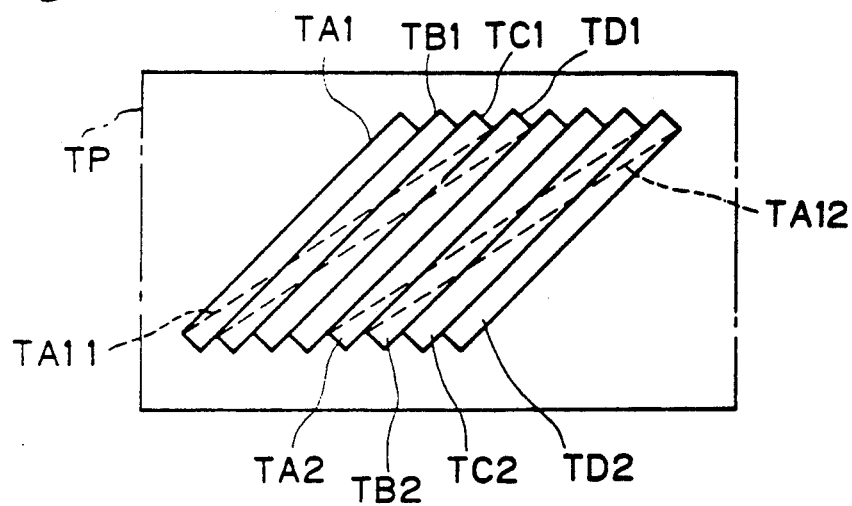
FIG. 12 is a schematic diagram showing a recording pattern of a tape.

An example of a part of a rotary head mechanism section is shown in FIG. 11. Rotary heads HA1, HB1, HC1, and HD1 are provided in close contact with a drum 31 rotating with a predetermined frequency, and rotary heads HA2, HB2, HC2, and HD2 are provided in close contact with these heads at an angle of 180°. A magnetic tape TP is obliquely wound around the circumference of the drum 31 at a wounding angle slightly larger than 180°. The magnetic tape TP is fed at a constant speed. As a result, as shown in FIG. 12, a track pattern where four tracks TA1, TB1, TC1, and TD1 formed by the rotary heads HA1, HB1, HC1, and HD1 and four tracks TA2, TB2, TC2, and TD2 formed by the rotary heads HA2, HB2, HC2, and HD2 are positioned alternately on a magnetic tape TP. The recording signal of the channel A consisting only of the coded output of average values is recorded onto the tracks TA1 and TA2 as mentioned above.

Figure 13:
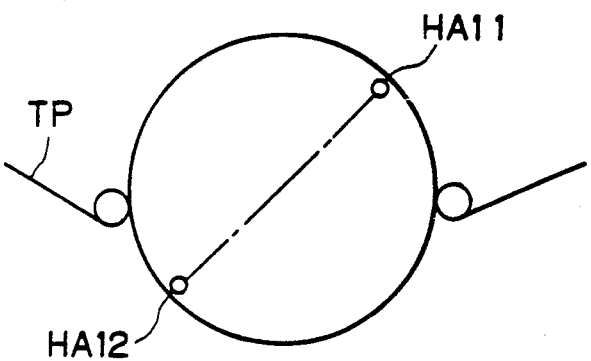
FIG. 13 is a schematic diagram showing an arrangement of rotary heads a VTR for a standard resolution video signal.

Although this one embodiment is an HD VTR for recording a high resolution video signal, the magnetic tape TP recorded as mentioned above by the SD VTR for recording a standard resolution video signal can be reproduced. The SD VTR has a pair of rotary heads HA11 and HA12 provided at an interval of 180° on a rotary drum as shown in FIG. 13. Each head scans the magnetic tape TP alternately.

The magnetic tape TP in which the track pattern of FIG. 12 is formed is fed at four-fold speed by the HD VTR and reproduced by the SD VTR. As a result, scanning tracks TA11 and TA12 extending Over the four tracks are formed alternately as shown by a broken line in FIG. 12. By displacing scanning positions of the rotary heads HA11 and HA12 by a piezoelectric element, control is preformed so that the scanning positions TA11 and TA12 coincide with the tracks TA1 and TA2, respectively. Therefore, the SD VTR can provide a reproduced picture (one-fourth of the resolution of the high resolution video signal) by ADRC decoding of an encoded signal related to average value data.

Also, conversely with the above-mentioned manner, a tape recorded by the SD VTR can be reproduced by the HD VTR. In this sense, the bidirectional compatibility can be achieved. A recording circuit of the SD VTR compresses picture data by ADRC without differential coding. As shown by a broken line in FIGS. 2 and 3, coding of four-bit fixed length is made for an ADRC block (4×4=16 picture elements in the SD VTR. Since four ADRC blocks are formed from the area of FIG. 2, recording data shown in FIG. 10B is provided. For example, recording data corresponding to the ADRC block containing x11, x12, ..., x43, x44 is composed of the minimum value MIN, dynamic range DR and code signals x11', x12', ..., x43', x44'. This recording data is recorded on the magnetic tape TP by the rotary head HA1 or the rotary head HA2.

When the magnetic tape where the recording data indicated in FIG. 10B has been recorded is reproduced by the HD VTR, the running speed of the magnetic tape is lowered to one-fourth of the normal speed. Tracking deviation due to this difference in the tape running speed is corrected by a piezoelectric element. The outputs of the rotary heads HA1 and HA2 among the rotary heads of the HD VTR, i.e., only a reproduced signal of the channel A, are treated as effective reproduction data, while reproduction data of other channels are brought to 0. The processing of this reproduced data can be carried out by an ADRC decoder of provided in a reproduction circuit of the HD VTR. In this way, the HD VTR can provide a reproduced picture with the same resolution at the time of reproduction as the SD VTR and with the same number of picture elements as those of a high resolution video signal.

In the above-mentioned one embodiment, four-picture element additional data is transmitted by every two bits for decoding picture elements allotted −2. However, since average value data is sent by ADRC encoding, there is the case where additional data of three picture elements except for the one at a predetermined position out of four picture elements may be transmitted. For example, assuming that the difference from the average value is extremely small, there is a possibility that such transmission is sufficient by allotting two bits and giving (3×2) bits. In this way, the compression of data amount can be made further.

This invention treats a block of the size provided by considering the ratio of resolution of two formats for video signals and enables the post-coding data amounts in both systems to be almost equal. Further, since average value information and additional data are encoded using separate methods, a reproduced picture can be constructed by decoding only the average value information. Therefore, there is an advantage of compatibility between the two formats.

In addition, according to the invention the average value is obtained at the reception side, since 2 bits of (00) are allotted to the average value. Furthermore, since there is no offset in a range being represented by two bits, high efficiency coding can be accomplished by the invention.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A highly efficient coding apparatus for encoding an input digital video signal comprised of digital video data representing relatively high resolution picture elements according to a first standard having a first picture element resolution which is a value N times greater than a second picture element resolution of relatively lower resolution picture elements according to a second standard, comprising:

averaging means for averaging said digital video data of said digital video signal representing said value N of said relatively high resolution picture elements so as to generate averaged data representing relatively lower resolution picture elements substantially according to said standard, block encoding means for encoding said averaged data in a block-type format allowing data compression so as to generate encoded data corresponding to said relatively lower resolution picture elements, subtracting means for subtracting from said averaged data each of said digital video data representing said value N of said relatively high resolution picture elements and providing subtracted data therefrom, additional encoding means for encoding said subtracted data so as to generate additional data, and combining means for combining said encoded data and said additional data in an order in which said encoded data is next to said additional data so as to generate combined encoded data corresponding to said relatively high resolution picture elements.

2. A highly efficient coding apparatus according to claim 1, further including block segmentation means receiving said digital video data for generating blocks of said digital video data representing plural groups of said N picture elements that are supplied to said averaging means, and wherein said block encoding means includes first and second detecting means for detecting maximum and minimum values, respectively, of said digital video data representing said plural groups of N picture elements in each of said blocks, means for generating dynamic range information for each of said blocks from said maximum and minimum values for the respective block, and dynamic range encoding means for encoding said blocks of said digital video data based on said dynamic range information.

3. A highly efficient coding apparatus according to claim 1, further including block segmentation means supplied with said digital video data for generating blocks of said digital video data representing plural groups of N picture elements, and wherein said block encoding means includes orthogonal transformation means supplied with said blocks of said digital video data for generating coefficient data including a DC component and a plurality of AC components for each of said blocks.

4. A highly efficient coding apparatus according to claim 1, wherein said subtracting means generates subtracted data corresponding to N−1 picture elements.

5. A highly efficient coding apparatus according to claim 1, further comprising distribution means for dividing said combined encoded data into a plurality of divided signals, wherein one of said divided signals is encoded digital video data corresponding to said relatively lower resolution picture elements according to said second standard.

6. A highly efficient coding apparatus according to claim 1, further comprising detecting means for detecting a distribution of levels of said digital video data representing N picture elements to generate a detection signal, and wherein said additional encoding means encodes said subtracted data on the basis of said detection signal.

7. A highly efficient coding apparatus according to claim 1, wherein said block encoding means operates at a data rate which is 1/N times a data rate of said digital video signal, and further comprising rate converting means for converting the data rate of said encoded data to the data rate of said digital video signal.

8. A highly efficient coding apparatus for coding digital video data representing picture elements and supplied in a block of picture elements in a sequence according to raster scanning of a digital video signal, comprising:

block segmentation means receiving said block of picture elements for generating sub-blocks of said digital video data, each of said sub-blocks including a portion of said digital video data which represents N picture elements, averaging means for averaging said digital video data representing N picture elements in said each of said sub-blocks so as to generate averaged data corresponding to said each of said sub-blocks, subtracting means for subtracting each of said digital video data in said each of said sub-blocks from said averaged data corresponding to said each of said sub-blocks and providing subtracted data therefrom, detecting means for detecting a distribution of levels of said digital video data representing said N picture elements in said each of said sub-blocks so as to generate a detection signal, encoding means responsive to said detection signal for encoding each of said digital video data in said each of said sub-blocks to encoded data having one of a first value equal to the value of said averaged data, a second value equal to said value of said averaged data plus the value of a difference data wherein the value of said difference data is based on the values of said averaged data and said subtracted data for said each of said sub-blocks, a third value equal to said value of said averaged data minus said value of said difference data, and a fourth value chosen in accordance with said value of said averaged data, said value of said difference data, said detection signal and the values of said digital video data, and combining means for combining said averaged data, said difference data and said encoded data in a predetermined order so as to generate highly efficiently encoded data corresponding to said block of said picture elements.

9. A highly efficient coding apparatus according to claim 8, wherein said picture elements in said block are relatively high resolution picture elements according to a first standard for a digital video signal, said averaged data represents relatively lower resolution picture elements substantially according to a second standard for a digital video signal, a portion of said highly efficiently encoded data corresponds to said relatively lower resolution picture elements, and said N is a value which is substantially the ratio of a picture element resolution according to said first standard relative to a picture element resolution according to said second standard.

* * * * *